July 8, 1958   R. B. BURRIS   2,841,830
TEXTILE ROLL BEARING
Filed March 8, 1954
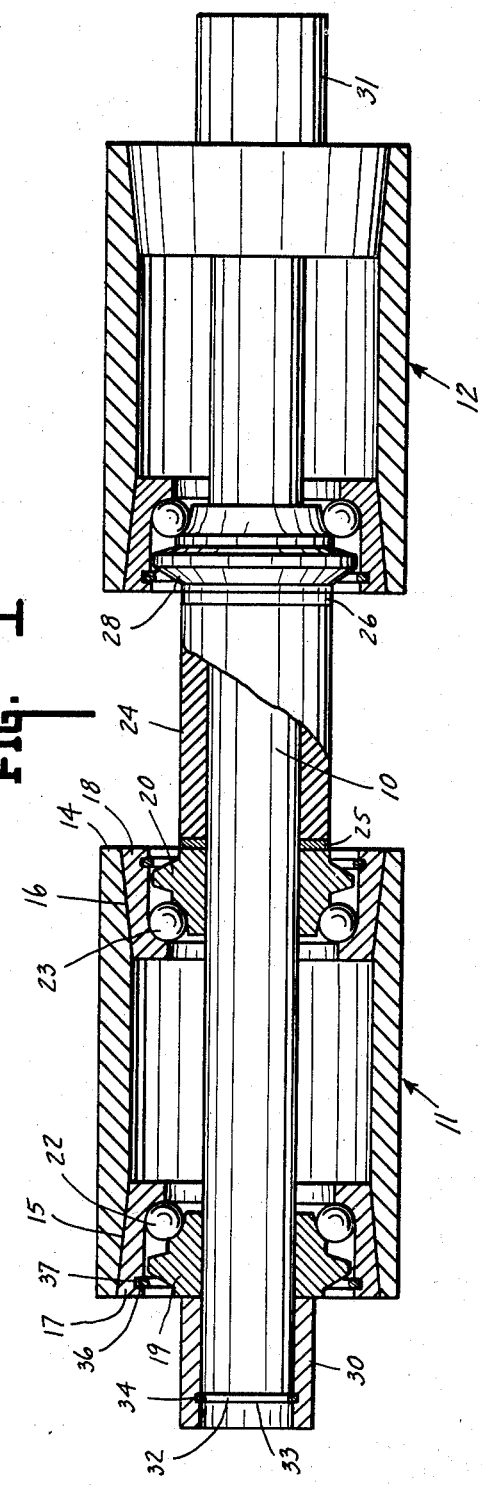
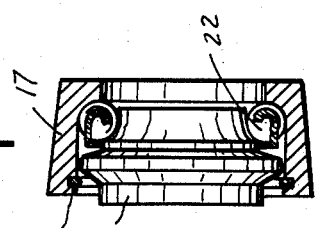
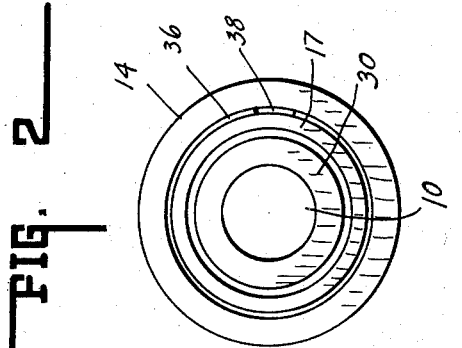
INVENTOR.
ROBERT B. BURRIS.
BY
Lockwood, Galt, Woodard & Smith
ATTORNEYS.

United States Patent Office 2,841,830
Patented July 8, 1958

2,841,830

TEXTILE ROLL BEARING

Robert B. Burris, Evansville, Ind., assignor to Faultless Caster Corporation, Evansville, Ind., a corporation Application March 8, 1954, Serial No. 414,787

7 Claims. (Cl. 19—142)

This invention relates generally to top rolls for spinning and drawing frames, and more particularly to bearing arrangements for such top rolls.

Conventional bearing structures for top rolls include ball bearings. Various means of sealing ball bearings to prevent accumulation of lint and grit have been devised, but they have met with varying success and involve an appreciable expense. It is necessary to seal such bearings due to the fact that the processing of cotton or other natural or manufactured fibers produces a substantial amount of waste in the form of short fibers and other foreign materials. Furthermore, no provisions are made in conventional bearing structures for self-lubrication over long periods of time and maintenance of perpetual adjustment.

Accordingly, the principal object of this invention is to improve ball bearing structures as applied to the top rolls of spinning and drawing frames to simplify the maintenance and operation thereof.

It is another object of this invention to provide a bearing structure which is self-maintaining over long periods of time and which remains in perpetual adjustment.

Still another object of this invention is to provide a bearing structure adapted to provide ample roller bearing support, to maintain a supply of lubricant such that the bearing may be self-lubricating for a long period of time and to provide sealing structure for preventing accumulation of lint or other foreign material within the bearing structure.

In accordance with this invention there is provided a top roll for use in spinning and drawing frames comprising a shaft, spaced pairs of bearing units slidably mounted on the shaft, a cot sleeve mounted on each pair of bearing units, a spacing collar on the shaft between said pairs of bearing units for locating them with respect to one another on said shaft, compressible pressure creating means between the ends of said sleeve and the bearing units for loading said units, trunnion ends mounted on the ends of said shaft in engagement with each pair of bearing units and locking means adapted to lock said bearing units into predetermined position with respect to said shaft.

In accordance with another feature of this invention there is provided a bearing unit comprising an inner raceway, an outer raceway having a peripheral groove disposed adjacent to the periphery of said inner raceway, and a sealing member nested within the groove in the outer raceway and having the form of an incomplete ring, the separated ends of which are burred for collecting foreign matter which may be disposed between the periphery of the inner raceway and the sealing member.

The full nature of the invention will be understood from the accompanying drawings and the following description and claims:

Fig. 1 is a partial longitudinal cross section of the top roll structure provided in accordance with this invention.

Fig. 2 is a reduced end elevation of the structure shown in Fig. 1.

Fig. 3 is a partial cross section of one of the bearing units illustrated in Fig. 1.

The top roll assembly provided in accordance with this invention comprises a shaft 10 on which is mounted a first roll unit 11 and a second roll unit 12. The roll units 11 and 12 being identical in structure, unit 11 will be described in detail.

Unit 11 comprises a cot sleeve 14, the inner surfaces of which are tapered at the ends as at 15 and 16 to receive the outer raceways 17 and 18 which have a conical form to fit the tapers 15 and 16. The inner bearing raceways 19 and 20 are slidably mounted on shaft 10 and are spaced from outer raceways 17 and 18, respectively, to provide rolling bearing surfaces for the ball bearings 22 in accordance with conventional practice. Because of the tapered surfaces 15 and 16, the bearing units consisting of raceways 17, 19 and ball bearings 22, together with the unit consisting of the raceways 18, 20 and ball bearings 23, are spaced from one another at a predetermined, fixed distance.

The roll units 11 and 12 are spaced from one another by means of a spacing collar 24 and the compressible washers 25 and 26 disposed between the ends of the collar 24 and the adjacent inner raceways 20 of unit 11 and 28 of unit 12. The compressible washers 25 and 26 are intended to be slightly compressed whereby the bearing units within the roll units 11 and 12 are pre-loaded to provide a tight fit between the ball bearings and their respective raceways. This eliminates play within the bearing units.

The compression action of the washers 25 and 26 is created by the provision of trunnion ends 30 and 31 mounted on the opposite ends of shaft 10 and held in position thereon by means of snap rings such as ring 32 mounted within a groove 33 in shaft 10 and extending into a groove 34 in the trunnion end 30. The groove 33 and the corresponding groove on the other end of shaft 10 (not shown) are precisely located, and the length of the trunnion ends 30 and 31 is precisely predetermined to exert a slight amount of pressure on the inner raceways of the bearing units, thereby to compress the washers 25 and 26 and preload the bearing units.

Each bearing unit is sealed and maintained in assembled relation by means of snap rings such as ring 36 (Fig. 2). This snap ring may be firmly seated within a groove 37 on the inner periphery of the outer raceways 17 and 18. The ring 36 is dimensioned to project into the path of the periphery of inner raceway 19, thereby to hold the bearing unit in assembled condition.

Snap ring 36 serves to seal the bearing unit against the entrance of lint or other foreign matter, due to the fact that the clearance between the outer periphery of inner raceway 19 and the inner surface of outer raceway 17 is of the order of three thousandths of an inch. Thus, the ring serves to close the gap created by this clearance. As a further means of preventing entrance of foreign matter within the bearing unit, the snap ring 36 is dimensioned to provide a gap 38 between its ends of the order of one tenth of an inch, and the ends of ring 36 are slightly burred. A combination of the gap 38 and the burrs at the ends of the ring serves to pick up the first few fibers or other foreign materials entering the gap, and these collected fibers have a sweeping action which serves to clean the gap between the inner and outer raceways.

From the foregoing description it will be apparent that this invention provides bearing structure for top rolls which is self-maintaining over long periods due to the fact that the snap rings such as 36 serve to prevent the entrance of foreign matter within the bearing units and also to maintain a supply of lubricant in the bearing units. Furthermore, perpetual adjustment of the bearing units is provided by the compressible washers 25, 26, which serve to pre-load all of the bearing units, thereby to prevent play therein.

The invention claimed is
1. A top roll for spinning and drawing frames comprising a shaft, a cot sleeve having tapered inner end surfaces, a pair of outer bearing raceways having a conical form to fit within the tapered ends of said sleeve, cooperating inner raceways mounted within said outer raceways, an annular series of ball bearings operating between each said inner and outer raceway, a groove formed in the inner periphery of each outer raceway outwardly of the inner raceway, and a snap ring mounted within each said groove in overlapping relation to the periphery of the inner raceway for retaining said inner raceway within its outer raceway as a bearing unit, and means removably secured on said shaft against axial displacement to engage and lock said bearing units in cot sleeve supporting position, whereby said bearing units may be removed upon removal of said locking means.

2. A top roll for spinning and drawing frames, comprising a shaft, a cot sleeve having tapered inner end surfaces, a pair of outer raceways correspondingly tapered to be removably accommodated within the ends of said sleeve, an inner raceway mounted within each outer raceway in spaced relation thereto with respect to the inner periphery of the outer raceway and the outer periphery of the inner raceway, a series of ball bearings operating between each said inner and outer raceway, and a snap ring mounted on said outer raceway in overlapping relation to the periphery of the inner raceway for retaining the inner raceway within its outer raceway as a bearing unit, and means removably secured on said shaft against axial displacement to engage and lock said bearing units in cot sleeve supporting position.

3. In a top roll for spinning and drawing frames comprising a shaft, a cot sleeve having tapered inner end surfaces, an outer bearing raceway having a conical form removably mounted within each end of said sleeve, an inner raceway mounted within each said outer raceway, a series of ball bearings operating between the respective inner and outer raceways, and a snap ring mounted in said outer raceway in overlapping relation to the peripheral outer end of the inner raceway for retaining said inner raceway within its outer raceway as a bearing unit, and means removably secured on said shaft against axial displacement to engage and lock said bearing units in cot sleeve supporting position.

4. A top roll for spinning and drawing frames comprising a shaft, a cot sleeve having axially spaced internal end surfaces tapering inwardly from each end, a pair of ball bearing units each having a conical outer surface conforming to and nesting within the tapered end surfaces of said sleeve respectively to be removably wedged axially thereof, and means removably secured on said shaft against axial displacement to engage and lock said bearing units in cot sleeve supporting position, whereby each said bearing unit may be removed upon removal of said locking means.

5. A top roll for spinning and drawing frames comprising a shaft, a cot sleeve having tapered inner end surfaces, ball bearing units comprising a pair of outer bearing raceways having a conical form to fit within the tapered ends of said sleeve, cooperating inner raceways mounted within said outer raceways in spaced relation thereto with respect to the inner peripheries of the outer raceways and the outer peripheries of the inner raceways, a series of ball bearings operating between each said inner and outer raceways, a groove formed in the inner periphery of each outer raceway outwardly of the inner raceway, a snap ring mounted within each said groove in overlapping relation to the periphery of the inner raceway, said snap ring being split to form a substantial gap therein and having its ends burred for gathering foreign matter from the periphery of said inner raceway, and means removably secured on said shaft against axial displacement to engage and lock said bearing units in cot sleeve supporting position.

6. A top roll for spinning and drawing frames comprising a shaft, a cot sleeve having tapered inner end surfaces, ball bearing units comprising a pair of outer bearing raceways adapted to fit within the ends of said sleeve, an inner raceway mounted within each outer raceway in spaced relation thereto with respect to the inner periphery of the outer raceway and the outer periphery of the inner raceway, a series of ball bearings operating between each said inner and outer raceways, a snap ring mounted on said outer raceway in overlapping relation to the periphery of the inner raceway, said ring being split to form a substantial gap therein and having its ends burred for gathering foreign matter from the periphery of said inner raceway, and means removably secured on said shaft against axial displacement to engage and lock said bearing units in cot sleeve supporting position.

7. In a top roll for spinning and drawing frames comprising a shaft, a cot sleeve having a tapered inner end surface, a bearing unit comprising an outer bearing raceway having a conical form and adapted to fit within the said tapered end of said sleeve, an inner raceway mounted within said outer raceway in spaced relation thereto with respect to the inner periphery of the outer raceway and the outer periphery of the inner raceway, a series of bearing members operating between said inner and outer raceways, a ring mounted in overlapping relation to the periphery of the inner raceway, said ring being split to form a substantial gap therein and having its ends burred for gathering foreign matter from the periphery of said inner raceway, and means removably secured on said shaft against axial displacement to engage and lock said bearing unit in cot sleeve supporting position.

References Cited in the file of this patent

UNITED STATES PATENTS

| | | |
|---|---|---|
| 2,150,796 | Brouwer et al. | Mar. 14, 1939 |
| 2,256,193 | Cobb | Sept. 16, 1941 |
| 2,525,591 | Cotchett | Oct. 10, 1950 |
| 2,621,374 | Waite | Dec. 16, 1952 |
| 2,674,012 | Noelting | Apr. 6, 1954 |